United States Patent [19]

Roth

[11] Patent Number: 4,957,176
[45] Date of Patent: Sep. 18, 1990

[54] PROCESS AND APPARATUS FOR DETERMINING THE CONSUMPTION OF A RAW MATERIAL IN A PROCESSING MACHINE

[75] Inventor: Udo Roth, Ranstadt, Fed. Rep. of Germany

[73] Assignee: Colortronic Reinhard GmbH & Co. KG, Friedrichsdorf-Köppern, Fed. Rep. of Germany

[21] Appl. No.: 377,703

[22] Filed: Jul. 10, 1989

[30] Foreign Application Priority Data

Aug. 17, 1988 [DE] Fed. Rep. of Germany ....... 3827927

[51] Int. Cl.$^5$ ..................... G01G 13/16; G01G 13/24
[52] U.S. Cl. ....................................... 177/59; 177/114
[58] Field of Search ......................... 177/59, 115, 132; 425/148

[56] References Cited

U.S. PATENT DOCUMENTS 4,809,795 3/1989 Neumann .............................. 177/59

*Primary Examiner*—George H. Miller, Jr.
*Attorney, Agent, or Firm*—Michael J. Striker

[57] ABSTRACT

A process for accurately determining the consumption of a raw material in a processing machine or machines, especially plastic processing machines, in which the raw material is stored in a central storage container, comprises weighing or gravimetrically determining only a portion of the raw material stored in the storage container and feeding it to an intermediate storage vessel, from which it is delivered to the processing machine. The apparatus for performing this process comprises a storage container, means for gravimetric determination of a portion of the raw material which comprise a weighing housing which is supported on weighing sensors and an intermediate storage vessel, and supply means for feeding the raw material from the intermediate storage vessel to the processing machine. The weight determination means and the intermediate storage vessel can be suitably disposed in the vicinity of the central raw material storage container. Means can be provided for detecting which of the processing machines is being fed with raw material from the intermediate storage vessel.

10 Claims, 2 Drawing Sheets

PROCESS AND APPARATUS FOR DETERMINING THE CONSUMPTION OF A RAW MATERIAL IN A PROCESSING MACHINE

BACKGROUND OF THE INVENTION

The invention relates to a process and apparatus for determining the consumption of a raw material in a processing machine and, more particularly, for determining the consumption of a fluid plastics material in a plurality of extrusion or injection molding machines, wherein the raw material is stored in a central storage container or silo and supplied to the processing machine or machines by a conveyor system, e.g. a vacuum conveyor system.

For a batch-related re-calculation a gravimetric determination of the amount of raw material consumed in the individual processing machines is often desired. A re-calculation is required e.g. to consider unavoidable losses in raw material at the start up of the machine operation after removing an operating disturbance or the like. The quantity of raw material consumed under such circumstances can be so significant that it is no longer negligible in relation to the weight of the manufactured product. It is further known that with large material throughput stock deviations frequently occur whereby it was up to now difficult and/or impossible to correlate them with the individual processing machines.

It is known for determining the raw material consumption to continuously weigh the amount of raw material which is contained in a receiving vessel mounted on the machine, e.g. a separator or a cyclone unit, i.e. directly at the processing machine. This kind of determination of consumption is not only impaired by the unvoidable vibrations in the vicinity of the processing machine, but it is further connected with considerable costs, since a complete gravimetric determination system must be provided at each processing machine. It is also known to determine gravimetrically the raw material consumption in the vicinity of a central raw material storage container from which a plurality of processing machines can be supplied, in that the weight of the central storage container with the raw material contained therein is continuously weighed, e.g. by means of a pressure cell or the like the storage container is superimposed. A severe disadvantage of this kind of weight determination is its inaccuracy, because generally the charges for an individual processing machine are some kilograms only, while the total weight of a storage container can be of the order of several tons.

SUMMARY OF THE INVENTION

Accordingly, it is an object of the invention to provide an improved process and apparatus for gravimetric determination of the consumption of raw material in a processing machine, especially a plastics processing machine.

It is a further object of the invention to provide a process and apparatus of the type referred to above, which are comparatively inexpensive and are not impaired by influences like vibrations or the like at the site of the processing machine.

Finally it is an object of the invention to provide a process and apparatus for determining the consumption of a raw material in a plurality of processing machines, e.g. plastics processing machines, in a comparatively inexpensive manner and with a high degree of accuracy and in such manner that the consumption of raw material can be readily correlated with the individual processing machines.

In accordance with the invention a process is provided for determining the consumption of a raw material in a processing machine, especially a plastics processing machine, in which said raw material being stored in a raw material storage container, comprising the steps of withdrawing a portion of the amount of the raw material stored in said storage container and gravimetrically determining said portion, storing said gravimetrically determined portion in an intermediate storage vessel, and supplying the processing machine with the raw material stored in said intermediate storage vessel.

Accordingly only a portion of the raw material stored in a central storage container is taken therefrom and after its gravimetric determination is stored in an intermediate store, Which preferably is disposed near the central storage container, prior to its supply to the processing machine involved. Several processing machines can be supplied with raw material from the same intermediate store. The gravimetrically determined portion stored in the intermediate storage vessel can correspond to the filling capacity of a receiving vessel at the processing machine concerned, e.g. a separator or cyclone unit. Since the weight determining means must be designed for weighing a portion of the quantity of raw material stored in the storage container only, even low charges of raw material can be weighed with the desired high accuracy. Only single weighing means must be provided for servicing a plurality of processing machines which means a substantial reduction in cost for the plant, its operation and maintenance compared to decentralized units mounted directly on the processing machines. Since weighing of the raw material occurs far from the processing machines, vibrations of the machines cannot effect the weighing process. Moreover the invention allows a precise balance segregation between storing and processing sections of a production plant.

The invention further provides a process for determining the consumption of a raw material in a plurality of processing machines, especially plastics processing machines, in which said raw material being stored in a raw material storage container, comprising the steps of withdrawing a portion of the amount of the raw material stored in said storage container, gravimetrically determining said portion, storing said gravimetrically determined portion in an intermediate storage vessel, said intermediate storage vessel being provided in the vicinity of said storage container, supplying the processing machines from said intermediate storage vessel with said raw material, and determining which one of said processing machines is being supplied with said raw material from said intermediate storage vessel.

The invention further provides an apparatus for determining the consumption of a raw material in a processing machine, especially a plastics processing machine, comprising a storage container for said raw material, means for gravimetric determination of a portion of the raw material withdrawn from said storage container, an intermediate storage vessel for receiving said gravimetrically determined portion of the raw material, and supply means connected to said intermediate storage vessel for supplying said raw material to said processing machine.

The invention further provides an apparatus for determining the consumption of a raw material in a plurality of processing machines, especially plastics processing machines, comprising a storage container for said raw material, means for gravimetric determination of a portion of the raw material withdrawn from said storage container, an intermediate storage vessel for receiving said gravimetrically determined portion of the raw material, and supply means designed for supply of a plurality of said processing machines and connected to said intermediate storage vessel for supplying said raw material to said processing machine, said means for gravimetric determination comprises weighing means, said weighing means and said intermediate storage vessel being provided directly under said storage container, and means for determining which one of said processing machines is being supplied with said raw material.

The apparatus according to the invention is particularly compact and inexpensive and is suitable to be positioned directly under the outlet of the storage container, i.e. sufficiently far from the production site to prevent vibrations or other influences from causing any influence on the weight determination process.

BRIEF DESCRIPTION OF THE DRAWINGS

The objects, features and advantages achieved by the invention will become more apparent from the following detailed description of a preferred embodiment of the invention, reference being made to the accompanying drawing, in which.

DETAILED DESCRIPTION OF THE INVENTION

Figure 1:
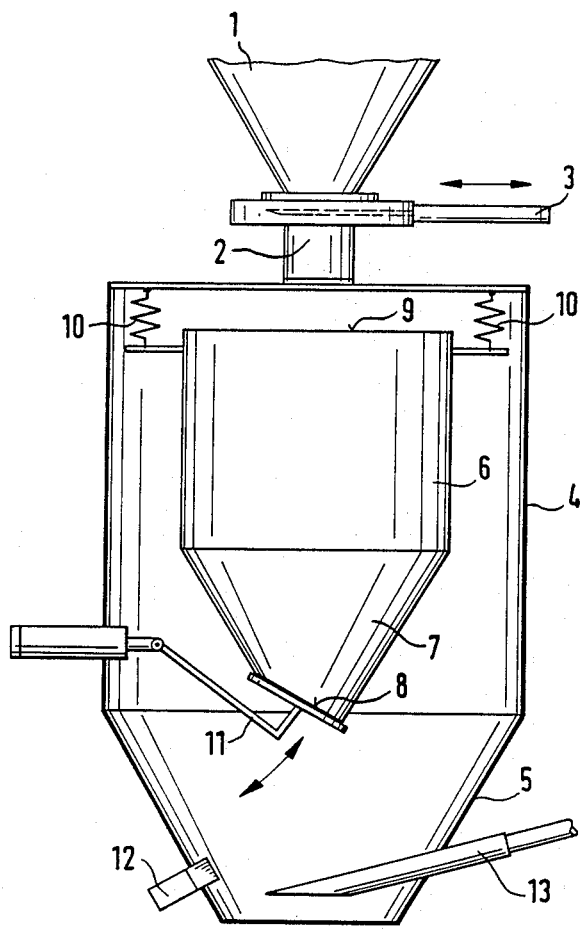
FIG. 1 is a schematic fragmentary cross sectional view of a weighing and intermediate storing apparatus according to the invention disposed beneath a central storage container (only partly shown)

In the drawing reference number 1 relates to a silo or storage container 1 adapted to receive a substantial quantity of a fluid, e.g. granulated or pulverized, raw material. Reference number 2 relates to an outlet of the storage container 1 with a therein provided closing member 3, e.g. in the form of a slide, for closing or opening the outlet 2.

Means are provided for gravimetric determination and storing of a portion of the raw material withdrawn from the storage container 1. This means comprise a vessel 4 forming an raw material intermediate store and having a funnel-shaped bottom 5, which is disposed in a fixed manner at a location under the outlet 2 of the storage container 1, and weighing means provided in the intermediate storage vessel 4. The weighing means comprise a weighing housing 6 adapted to receive the portion of the raw material to be weighed. The weighing housing 6 is suspended or mounted on suitable weighing sensors 10, e.g. a force measuring cells or the like, and has an upper opening 9 communicating with the outlet 2 of the storage container 1 and a lower funnel-like outlet portion 7 adjacent the bottom 5 of the intermediate storage vessel 4. An outlet opening 8 at the lower end of the weighing housing 6 can be opened and closed by a mechanically or pneumatically operable closing member 11.

Further provided are supply means for feeding the raw material stored in the intermediate storage vessel 4 to the individual processing machines. Such means comprise a suction duct 13 extending into the funnel-like bottom portion 5 of the intermediate storage vessel 4. The suction duct 13 can be part of a vacuum or suction conveyor system shown in FIG. 2 for connecting the intermediate storage vessel 4 with a plurality of processing machines $P_1$, $P_2$, $P_3$, particularly with the raw material receiving vessels disposed on the individual machines. The receiving vessels can be in the form of separator or cyclone units mounted on the machines and described in more detail in the applicant's Prospectus No. 8601/5000.For a detailed description of a vacuum conveyor system for supply of a plurality of processing machines with raw material which is particularly suitable for use in connection with the present invention, reference can be also made to this Prospectus the disclosure of which is thereby incorporated in the present invention.

As is further shown in FIG. 1, a sensor or probe 12 is provided for detecting the filling status of the intermediate storage vessel 4 with raw material.

Figure 2:
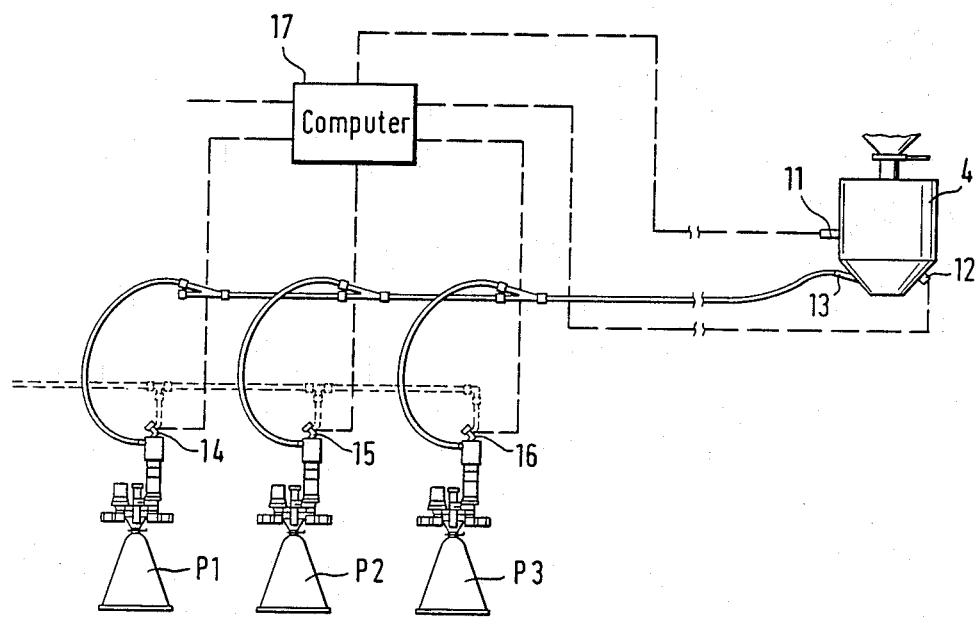
FIG. 2 is a schematic view of vacuum supply means for suppyling a plurality of processing machines with raw material including means for determining which one of the processing machines is being supplied with the raw material.

Means are further provided for detecting which one of the processing machines is being supplied with raw material from the intermediate storage vessel 4. While other means could be used for the purpose of the present invention, the detecting means as shown in FIG. 2 comprise a plurality of detectors 14, 15, 16 associated to valves (see FIG. 2) at the individual receiving vessels. These valves serve to open or close a communicating of the interior of the receiving vessels with a common suction line for sucking in the raw material contained in the suction duct 13. The output signals of the detectors 14, 15, 16 responsive to the opening or closing position of these valves are supplied to suitable means, e.g. in the form of a central computing unit 17, for storing the signalled status of the raw material supply to and for correlating it with the individual processing machines. Means 17 can be also used for controlling the operation of the closing member 11 for closing and opening outlet 8 of the weighing housing 6 responsive to a signal from the sensor 12 indicating that the intermediate storage vessel 4 has become empty.

The operation of the predescribed apparatus is as follows:

After opening the outlet 2 of the storage container 1 the raw material is admitted to the weighing housing 6 and simultaneously a first weight determination is made. As soon as a certain quantity of raw material has entered the weighing housing 6, due to a suitable signal from the weighing elements 10 the outlet 2 of the storage container 1 is again closed. Thereafter a final determination of the weight of the raw material received in the weighing housing 6 is made with the outlet 8 of the weighing housing 6 closed. After this final weight determination the outlet 8 of the weighing housing 6 is opened so that the weighed portion of the raw material moves from the weighing housing 6 into the storage vessel 4 wherefrom it can be supplied by means of the suction duct 13 to the individual processing machines. After emptying the weighing housing 6 its outlet 8 is again closed by the member 11. The emptying of the intermediate storage vessel 4 can be monitored by the probe 12 which prevents a fresh feed of weighed raw material from entering the intermediate storage vessel 4 before it has become completely empty. The portion of raw material weighed in the weighing housing 6 and stored in the intermediate storage vessel 4 should be suitably metered to fit the needs of a processing machine. Preferably this portion of raw material is metered such it corresponds essentially to the filling capacity of a raw material receiving vessel of a processing machine.

It will be understood that each of the parts or elements described above, or two or more together, may also find a useful application in other types of apparatus differing from the type described above.

While the invention has been illustrated and described as embodied in a process and apparatus for gravimetric determination of the consumption of raw material in a processing machine or machines, it is not intended to be limited to the details shown, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letter Patent is set forth in the appended claims:

1. A process for determining the consumption of a raw material in a processing machine, especially a plastics processing machine, in which said raw material is stored in a raw material storage container, comprising the steps of withdrawing a portion of the quantity of the raw material stored in said storage container, gravimetrically determining said portion, storing said gravimetrically determined portion in an intermediate storage vessel, connecting a plurality of said processing machines with said intermediate storage vessel, supplying one of said processing machines with said raw material and determining which one of said processing machines is being supplied with said raw material from said intermediate storage vessel.

2. A process according to claim 1 further comprising the step of providing said intermediate storage vessel in the immediate vicinity of said storage container.

3. A process according to claim 1 further comprising the step of re-filling said intermediate storage vessel after a complete emptying only.

4. A process according to claim 1 wherein said portion of the raw material corresponds at least substantially to the filling capacity of a raw material-receiving vessel of said processing machine.

5. An apparatus for determining the consumption of a raw material in a processing machine, especially a plastics processing machine, comprising:
   a storage container for said raw material;
   means for gravimetric determination of a portion of the raw material withdrawn from said storage container;
   an intermediate storage vessel for receiving said gravimetrically determined portion of the raw material;
   supply means connected to said intermediate storage vessel for supplying said raw material to a plurality of said processing machines with said raw material from said intermediate storage vessel; and
   means for determining which one of said processing machines is being supplied with said raw material.

6. An apparatus according to claim 5 wherein said means for gravimetric determination comprises weighing means, said weighing means and said intermediate storage vessel are provided directly under said storage container.

7. A process for determining the consumption of a raw material in a plurality of processing machines, especially plastics processing machines, in which said raw material is stored in a raw material storage container, comprising the steps of withdrawing a portion of the quantity of the raw material stored in said storage container, gravimetrically determining said portion, storing said gravimetrically determined portion in an intermediate storage vessel, said intermediate storage vessel being provided in the immediate vicinity of said storage container, supplying the processing machines from said intermediate storage vessel with said raw material, and determining which one of said processing machines is being supplied with said raw material from said intermediate storage vessel.

8. A process according to claim 7 further comprising the step of re-filling said intermediate storage vessel after a complete emptying thereof only.

9. A process according to claim 7 wherein said portion the raw material corresponds at least substantially to the filling capacity of a raw material-receiving vessel of said processing machine.

10. An apparatus for determining the consumption of a raw material in a plurality of processing machines, especially plastics processing machines, comprising:
    a storage container for said raw material;
    means for gravimetric determination of a portion of the raw material withdrawn from said storage container;
    an intermediate storage vessel for receiving said gravimetrically determined portion of the raw material; and
    supply means designed for supply of a plurality of said processing machines and connected to said intermediate storage vessel for supplying said raw material to said processing machines,
    said means for gravimetric determination comprise weighing means, said weighing means and said intermediate storage vessel being provided directly under said storage container; and
    means for determining which one of said processing machines is being supplied with said raw material.

* * * * *